J. T. FERRES.
METAL WINDOW SILL.
APPLICATION FILED AUG. 19, 1909.
967,626.
Patented Aug. 16, 1910.
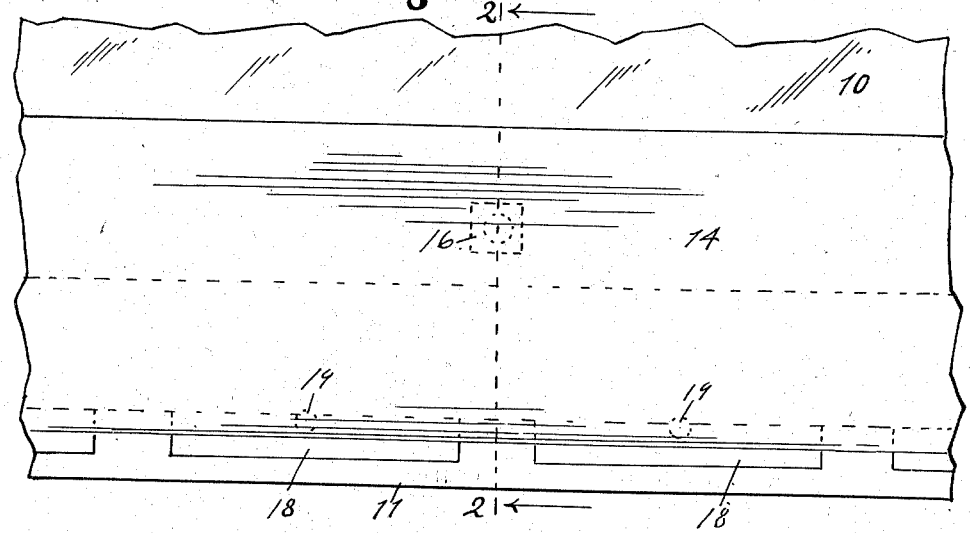
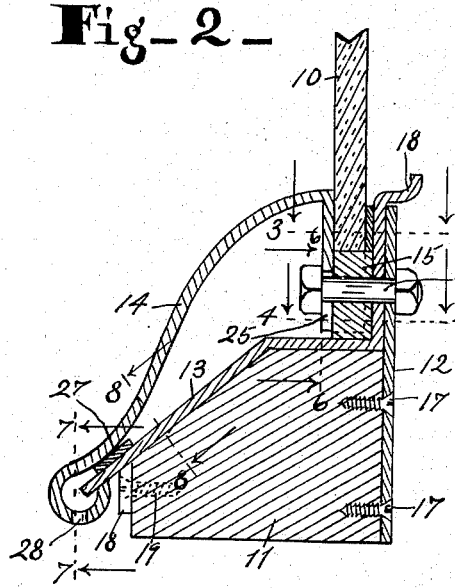
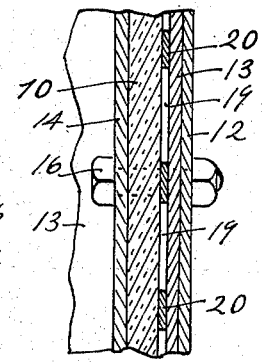
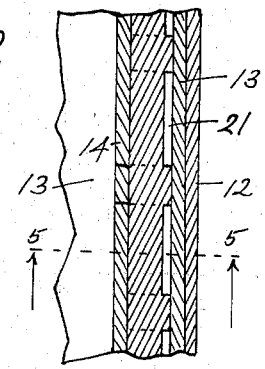
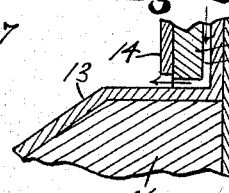
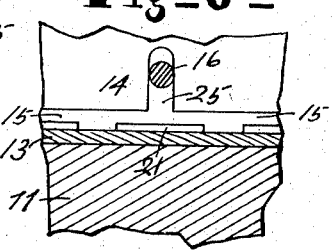
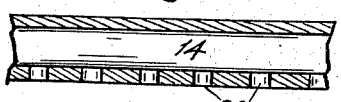
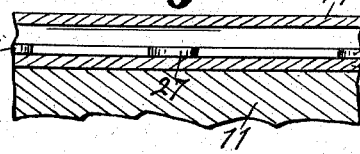
WITNESSES:
INVENTOR.
Jeffrey T. Ferres.
BY
ATTORNEY.

UNITED STATES PATENT OFFICE.

JEFFREY T. FERRES, OF ANDERSON, INDIANA.

METAL WINDOW-SILL.

967,626.
Specification of Letters Patent.
Patented Aug. 16, 1910.

Application filed August 19, 1909. Serial No. 513,699.

*To all whom it may concern:*

Be it known that I, JEFFREY T. FERRES, of Anderson, county of Madison, and State of Indiana, have invented a certain new and useful Metal Window-Sill; and I do hereby declare that the following is a full, clear, and exact description thereof, reference being had to the accompanying drawings, in which like letters refer to like parts.

The object of this invention is to provide an improved construction of metal window sills for holding plates of glass, and the like, although it is not necessarily limited to use in connection with plate glass.

The chief feature of the invention consists in the arrangement whereby all the moisture that flows down the inner surface of the plate will be conveyed under the plate and outwardly discharged and by means that absolutely protects the wooden sill. In devices of the kind heretofore, the fixed moisture has been enabled to enter the wooden sill around the screws and otherwise on top, whereby the means for holding the plate glass in position soon gets loose, as the wood rapidly decays.

The nature of the invention will be understood from the accompanying drawings and the following description and claims.

In the drawings Figure 1 is a front elevation of the lower part of a glass plate and the means for securing it to the sill. Fig. 2 is a central vertical cross section thereof on the line 2—2 of Fig. 1. Fig. 3 is a horizontal section on the line 3—3 of Fig. 2. Fig. 4 is a horizontal section on the line 4—4 of Fig. 2. Fig. 5 is a vertical section on the line 5—5 of Fig. 4. Fig. 6 is a vertical section on the line 6—6 of Fig. 2. Fig. 7 is a vertical section on the line 7—7 of Fig. 2. Fig. 8 is a section on the line 8—8 of Fig. 2.

In detail there is shown a plate glass 10 and a wooden sill 11 which may be of any desired form. The fastener includes three main plates 12, 13 and 14, a strip of wood 15 on which the lower edge of the plate of glass rests, and a clamping bolt 16 for clamping the plates and wood strip together and against the glass plate.

The plate 12 is secured to the inner surface of the sill 11 by screws 17, while the plate 13 covers the top of the sill 11 and has downwardly extending portions or tongues 18 that are secured to the front or outer surface of the sill by screws 19. It is observed, therefore, that there are no screws entering the top of the sill 11 whereby water could gain access to the wood. The plate 12 extends straight above the sill 11 and also the upper part of the plate 13 is vertical and lies against said plate 12, so that the upper portions of said plates are clamped together, but to prevent any moisture whatever passing between said plates down to the wooden sill, the upper edge of the plate 13 is bent inwardly to form a water catching strip 18 that projects over the upper edge of the plate 12 and keeps all moisture from gaining access to said plate and also directs the water outwardly through the downwardly extending spaces 119 that are located between the upper part of the plate 13 and the plate glass 10. These two plates are held apart by spacing blocks 20, as shown in Figs. 2 and 3, so as to provide the outlets 19. The moisture goes from the outlets 119 down through grooved spaces 21 in the inner surface of the wooden strip 15 and in the under surface of said strip, as indicated in Figs. 4 and 5. Since the plate 10 and the wooden strip 15 lie on the plate 13, there is no chance for any moisture to enter the sill 11. The outer portion of the sill 11 is beveled and the plate 13 bent obliquely downward so that the water referred to will run down the plate 13 over the outer edge.

The outer plate 14 has its upper end bent downwardly so as to bear against the window glass 10 and the strip 15. That portion has slots 25 located at intervals through which the bolt 16 extends and whereby said plate 14 is clamped on the outer side of the glass plate. Fig. 6 illustrates the form of this part of the plate 14 and its relation to the other parts. The lower part of plate 14 is spaced from the plate 13 by spacing blocks 27 located at intervals, as indicated in Fig. 8. The spaces between the plates 13 and 14 are to permit the water to flow off the plate 13. The lower end of the plate 14 is curved inwardly in an arc of a circle so as to envelop the lower edges of the plate 13. The water passing from plate 13 escapes through the holes 28.

It is obvious with this fastener and construction that sill 11 will be completely preserved against the admission of moisture that flows from the inner surface of the window plate 10. Likewise all such moisture from the inner plate 12 will be directed through the construction below the window plate and outwardly where it can escape, and the construction effectively holds the window in place and is readily removed to replace the wooden strip 15, or to replace a broken glass without disturbing articles that may be inside the window.

What I claim as my invention and desire to secure by Letters Patent is:

1. The combination with a vertically disposed glass plate or the like, and a fixed sill below with which said plate is secured, of a fastener for securing said plate to said fixed sill which includes a metal plate extending upwardly by the side of said glass plate and downwardly under said glass plate and over said fixed sill, the upper edge of said metal plate being bent away from the glass plate so as to receive water running down the glass plate, downwardly disposed conduits between the glass plate and metal plate for conveying the water therefrom, and means for securing said metal plate to the sides of said fixed sill.

2. The combination with a vertically disposed glass plate or the like, and a fixed sill below to which said plate is secured, of a fastener for securing said plate to said fixed sill including a metal plate with its upper portion beside said glass plate and its lower portion covering said sill, a strip between the glass plate and the metal plate upon which the glass plate rests, means for securing said metal plate to the forward surface of the sill, a plate secured to the rear surface of the sill and extending upwardly against the upper portion of said metal plate, and a bolt extending through said metal plate and strip for securing the same to the glass plate.

3. The combination with a vertically disposed glass plate or the like, and a fixed sill below with which said glass plate is secured, of a fastener for securing said plate to said sill including a vertical metal plate secured to the inner surface of the sill, another metal plate extending upwardly beside the glass and with its upper edge bent away from the glass plate over said vertical metal plate so as to receive water running down the glass plate and said second metal plate extending downwardly under said glass plate and over said fixed sill with its lower portion secured to the outer vertical surface of said fixed sill, a strip under the glass plate and upon said second metal plate, a third and outer metal plate with its upper portion bent downwardly and lying against the plate of glass, and said strip under the plate of glass and the lower part extending under the lower portions of said second metal strip and curved thereunder to catch the water running off said second metal strip, said lower portion of the outer metal strip being perforated to permit the escape of water therefrom, and bolts extending through said metal plates and strip under the glass plate for clamping them together and against the glass plate.

In witness whereof, I have hereunto affixed my signature in the presence of the witnesses herein named.

JEFFREY T. FERRES.

Witnesses:
F. V. POWELL,
M. L. TWOMBY.